No. 797,059. PATENTED AUG. 15, 1905.
P. J. HEDLUND.
MEANS FOR COOLING PUMP MOTORS.
APPLICATION FILED JAN. 12, 1905.
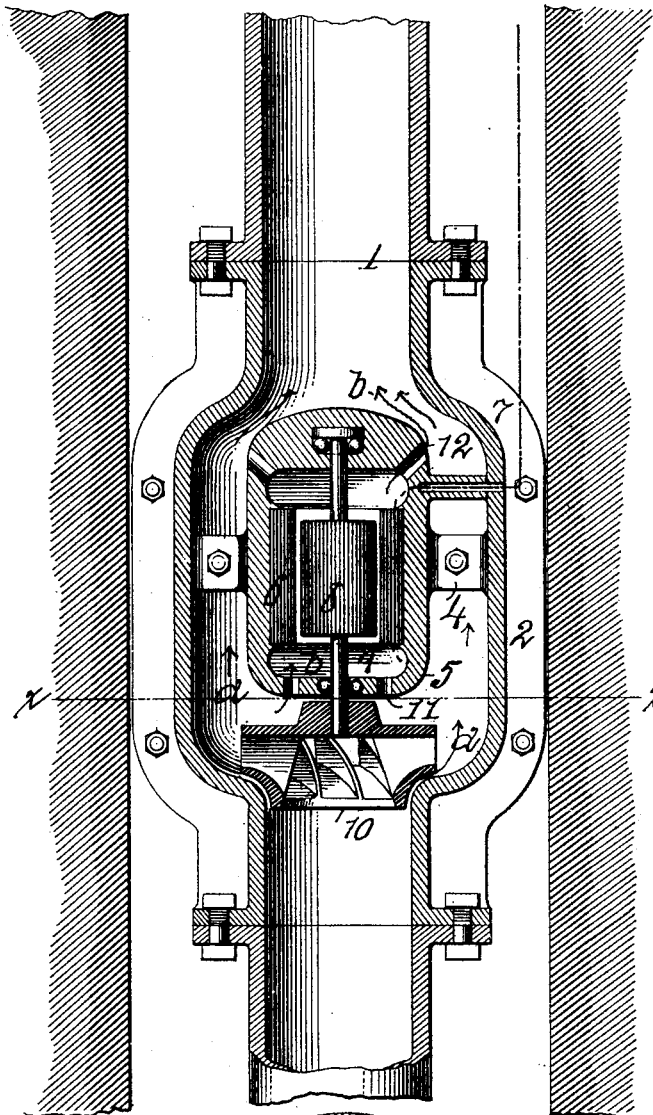
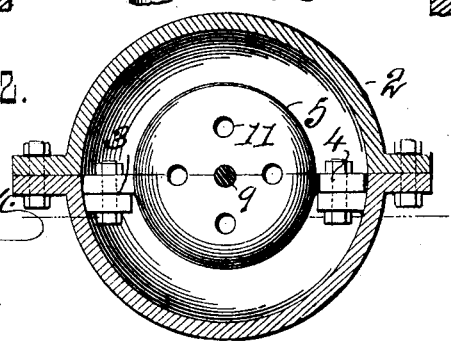
WITNESSES:
Gustave Dietrich
Edwin H. Dietrich
INVENTOR
Per J. Hedlund
BY Carl Benjamin
his ATTORNEY

UNITED STATES PATENT OFFICE.

PER JOHAN HEDLUND, OF STOCKHOLM, SWEDEN.

MEANS FOR COOLING PUMP-MOTORS.

No. 797,059.          Specification of Letters Patent.          Patented Aug. 15, 1905.

Application filed January 12, 1905. Serial No. 240,728.

*To all whom it may concern:*

Be it known that I, PER JOHAN HEDLUND, of Stockholm, Sweden, have invented a new and useful Improvement in Means for Cooling Pump-Motors, of which the following is a specification.

The invention relates to the constant cooling and lubrication of a motor employed for actuating a pumping device, and more particularly to the cooling and lubrication of a motor permanently inclosed with the pumping device in a chamber, such as an oil-pipe line.

The invention consists in the combination, with a motor having a casing and a moving member therein, of a pumping device for liquid actuated by said member, and means for conveying the liquid from said pumping device through said motor-casing and around said moving member; also, in the combination of a polyphase electric motor having its stator in the form of a hollow casing and its rotor wholly inclosed in said casing, of a pumping device for liquid actuated by said motor, and means for conveying said liquid through said stator and around said rotor; also, in the various combinations more particularly set forth in the claims.

In the accompanying drawings, Figure 1 is a longitudinal section of a portion of a pipe-line, showing my device located therein. Fig. 2 is a transverse section on the line $x\,x$ of Fig. 1.

Similar numbers of reference indicate like parts.

1 represents an inclosing chamber communicating with a source of liquid-supply—such, for example, as a line of pipe—as ordinarily employed for the conveyance of oil from wells to tide-water or refineries.

2 is a flanged junction-box made in two parts flanged and bolted together. In the lower part of said box are flanges 3, to which are secured flanges 4 on the hollow cylindrical shell or casing 5. Said shell has internal projections and coils 6 thereon, and the said coils are connected with main conductors, (indicated at 7,) so as to receive polyphase current from any suitable source. The casing 5 and coils 6 form the stator of a polyphase electric motor, the rotor 8 of which is supported on the shaft 9, which at one end is stepped in the casing 5 and at the other extremity has a bearing in said casing. The protruding end of shaft 9 carries a pump-wheel 10. In the end walls of casing 5 are openings 11 and 12.

The operation of the device is as follows: When polyphase current is established, the pump-wheel 10 is set in rotation, causing a circulation of liquid through the pipe and box. Said liquid passes around the exterior of the motor, as indicated by the arrows $a$, and also by the openings 11 and 12 through the interior of the stator or casing 5, as indicated by arrows $b$. The effect of the liquid thus circulating is to keep the motor constantly cool and always lubricated, and thus to insure its effective operation. The motor thus arranged may be inclosed in an oil-pipe line and left indefinitely without requiring attention to counteract effects of heating or friction.

I claim—

1. The combination with a motor having a casing and a moving member therein of a chamber inclosing said motor and communicating with a source of liquid-supply, a pumping device in said chamber and means for conveying said liquid through said motor-casing and around said moving member.

2. The combination with a motor having a casing and a moving member therein of a chamber inclosing said motor and communicating with a source of liquid-supply, a pumping device in said chamber and means for conveying the said liquid around said motor-casing and also through said motor-casing and around said moving member.

3. The combination with a motor having a casing and a rotary member therein, of a chamber inclosing said motor and communicating with a source of liquid-supply, a pump-wheel in said chamber actuated by said motor and means for conveying the liquid moved by said wheel through said motor-casing and around said rotary member.

4. The combination of a polyphase electric motor having its stator in the form of a hollow casing and its rotor wholly inclosed in said casing, a chamber inclosing said motor and communicating with a source of liquid-supply, a pumping device in said chamber and means for conveying said liquid through said casing and around said rotor.

In testimony whereof I have signed my name to this specification in the presence of two subscribing witnesses.

PER JOHAN HEDLUND.

Witnesses:
    WALDEMAR BOMAN,
    ERIK FOSSBERG.